(12) United States Patent
Törnström

(10) Patent No.: US 12,326,212 B2
(45) Date of Patent: Jun. 10, 2025

(54) TRANSIT FOR PASSING CABLES AND/OR PIPES THROUGH A PARTITION OPENING AND USE OF SUCH A TRANSIT

(71) Applicant: ROXTEC AB, Karlskrona (SE)

(72) Inventor: Tony Törnström, Karlskrona (SE)

(73) Assignee: ROXTEC AB, Karlskrona (SE)

( * ) Notice: Subject to any disclaimer, the term of this patent is extended or adjusted under 35 U.S.C. 154(b) by 0 days.

(21) Appl. No.: 18/268,704

(22) PCT Filed: Dec. 13, 2021

(86) PCT No.: PCT/SE2021/051237
§ 371 (c)(1),
(2) Date: Jun. 21, 2023

(87) PCT Pub. No.: WO2022/146216
PCT Pub. Date: Jul. 7, 2022

(65) Prior Publication Data
US 2024/0295279 A1    Sep. 5, 2024

(30) Foreign Application Priority Data

Jan. 4, 2021 (SE) .................................... 2150001-2

(51) Int. Cl.
*F16L 5/02* (2006.01)
*F16L 5/08* (2006.01)
(Continued)

(52) U.S. Cl.
CPC ................. *F16L 5/02* (2013.01); *F16L 5/08* (2013.01); *H02G 3/22* (2013.01); *H02G 15/013* (2013.01)

(58) Field of Classification Search
CPC ...... F16L 5/02; F16L 5/04; F16L 5/08; H02G 3/22; H02G 15/013
(Continued)

(56) References Cited

U.S. PATENT DOCUMENTS

| 469,005 | A | * | 2/1892 | Anderson | ................. F16L 5/00 52/220.8 |
| 2,732,226 | A | * | 1/1956 | Brattberg | ................. H02G 3/22 248/68.1 |

(Continued)

FOREIGN PATENT DOCUMENTS

| CN | 101571211 A | * | 11/2009 | |
| CN | 106764094 A | * | 5/2017 | ............... F16L 5/02 |

(Continued)

OTHER PUBLICATIONS

PCT International Search Report for PCT Application No. PCT/SE2021/051237 mailed Feb. 24, 2022 (4 pages).
(Continued)

*Primary Examiner* — Taylor Morris
(74) *Attorney, Agent, or Firm* — Merchant & Gold P.C

(57) ABSTRACT

A transit for passing at least one cable (11) and/or at least one pipe through an opening (22) in a partition (12), wherein the transit comprises a first frame (19), a second frame (20), wherein the second frame (20) is arranged with through apertures (24) and the first frame (19) is arranged with holes (25) for receiving threaded fastening screws (23), so that the first and second frames (19, 20) can be clamped on opposite sides of the partition (12) by means of the fastening screws. The transit (10) further comprises a partition opening liner (21) for engaging the first frame (19) and the second frame (20) and form a radially lined passage extending in an axial direction between the first frame (19) and the second frame (20). Disclosed is also the use of such a transit (10).

11 Claims, 7 Drawing Sheets

(51) Int. Cl.
*H02G 3/22* (2006.01)
*H02G 15/013* (2006.01)

(58) Field of Classification Search
USPC .................................................. 52/220.8
See application file for complete search history.

(56) References Cited

U.S. PATENT DOCUMENTS

| | | | | |
|---|---|---|---|---|
| 2,964,342 A * | 12/1960 | Mainprize | ................ | F16L 5/08 277/621 |
| 3,115,539 A * | 12/1963 | Stuessel | ................ | H02G 3/22 52/220.8 |
| 4,061,344 A * | 12/1977 | Bradley | ................ | E04B 1/947 277/606 |
| 4,099,020 A * | 7/1978 | Kohaut | ................ | H02G 3/185 174/505 |
| 4,249,353 A | 2/1981 | Berry | | |
| 4,264,779 A * | 4/1981 | Rhodes | ................ | H02G 3/185 52/220.8 |
| 4,291,195 A * | 9/1981 | Blomqvist | ................ | H02G 3/22 174/505 |
| 4,572,923 A * | 2/1986 | Castellani | ................ | H02G 3/185 220/3.6 |
| RE32,678 E * | 5/1988 | Benscoter | ................ | H02G 3/22 52/220.8 |
| 5,568,947 A * | 10/1996 | Paquette | ................ | F16L 5/00 52/220.8 |
| 6,141,915 A * | 11/2000 | Andersen | ................ | H02G 3/22 52/220.8 |
| 6,681,524 B1 * | 1/2004 | Tillson | ................ | E06B 7/32 160/180 |
| 7,094,968 B2 * | 8/2006 | Motzigkeit | ................ | H02G 15/013 16/2.2 |
| 7,396,998 B2 * | 7/2008 | Kreutz | ................ | F16L 5/08 174/651 |
| 7,913,454 B2 * | 3/2011 | Sullivan | ................ | E06B 7/32 160/180 |
| 8,307,592 B2 * | 11/2012 | Chang | ................ | F16L 5/14 52/220.8 |
| 8,621,796 B2 * | 1/2014 | Egritepe | ................ | F16L 7/02 52/220.8 |
| 8,674,240 B2 * | 3/2014 | Karlsson | ................ | F16L 5/08 174/652 |
| 8,833,478 B2 * | 9/2014 | Zernach | ................ | A62C 3/16 52/220.8 |
| 8,898,974 B1 * | 12/2014 | Gardner | ................ | E04C 2/52 52/220.8 |
| 9,291,268 B2 * | 3/2016 | Kurz | ................ | F16J 15/104 |
| 9,915,379 B2 * | 3/2018 | Egritepe | ................ | H02G 3/22 |
| 10,298,001 B2 * | 5/2019 | Nowastowski-Stock | ................ | H02G 1/06 |
| 10,574,048 B2 * | 2/2020 | Nowastowski-Stock | ................ | H02G 3/0406 |
| 11,781,680 B2 * | 10/2023 | Wright | ................ | F16L 5/02 52/58 |
| 2005/0011663 A1 * | 1/2005 | Kreutz | ................ | H02G 3/22 174/61 |
| 2008/0022612 A1 * | 1/2008 | Jones | ................ | F16L 5/02 52/220.8 |
| 2009/0126992 A1 * | 5/2009 | Horn | ................ | F16L 5/08 174/656 |
| 2010/0001476 A1 * | 1/2010 | Broder | ................ | F16L 5/08 277/606 |
| 2012/0013079 A1 * | 1/2012 | Andersson | ................ | F16L 5/08 277/606 |
| 2013/0257039 A1 | 10/2013 | Bibbo et al. | | |
| 2015/0047276 A1 | 2/2015 | Gandolfo et al. | | |
| 2016/0281884 A1 * | 9/2016 | Johansson | ................ | H02G 3/22 |
| 2019/0219170 A1 * | 7/2019 | Gandolfo | ................ | F16J 15/022 |
| 2020/0165814 A1 | 5/2020 | Andersson et al. | | |
| 2023/0220932 A1 * | 7/2023 | Gibson | ................ | F16L 5/14 52/220.8 |

FOREIGN PATENT DOCUMENTS

| | | | | |
|---|---|---|---|---|
| DE | 3916752 A1 * | 11/1990 | ............ | F16L 15/14 |
| DE | 0429916 A2 * | 6/1991 | ............ | F16L 41/00 |
| DE | 10052266 A1 * | 4/2002 | ............ | F16L 5/10 |
| DE | 102004011669 A1 * | 9/2004 | ............ | F16L 5/08 |
| DE | 202009003184 U1 * | 9/2010 | ............ | F16L 5/08 |
| EP | 2696124 B1 * | 9/2015 | ............ | E04G 15/061 |
| KR | 20090072268 A * | 7/2009 | ............ | F16L 5/02 |
| KR | 20180043953 A * | 5/2018 | ............ | F16L 23/032 |
| RU | 180659 U1 | 6/2018 | | |
| SE | 0757142 A1 * | 2/1997 | ............ | H02G 3/22 |
| SE | 0898106 A1 * | 2/1999 | ............ | F16L 5/08 |
| WO | WO-0128057 A1 * | 4/2001 | ............ | H02G 15/013 |
| WO | WO-2009139713 A1 * | 11/2009 | ............ | F16L 5/08 |
| WO | 2010089289 A2 | 8/2010 | | |

OTHER PUBLICATIONS

PCT Written Opinion for PCT Application No. PCT/SE2021/051237 mailed Feb. 24, 2022 (8 pages).
Swedish Search Report for Application No. 2150001-2 mailed on Sep. 8, 2021 (2 pages).

* cited by examiner

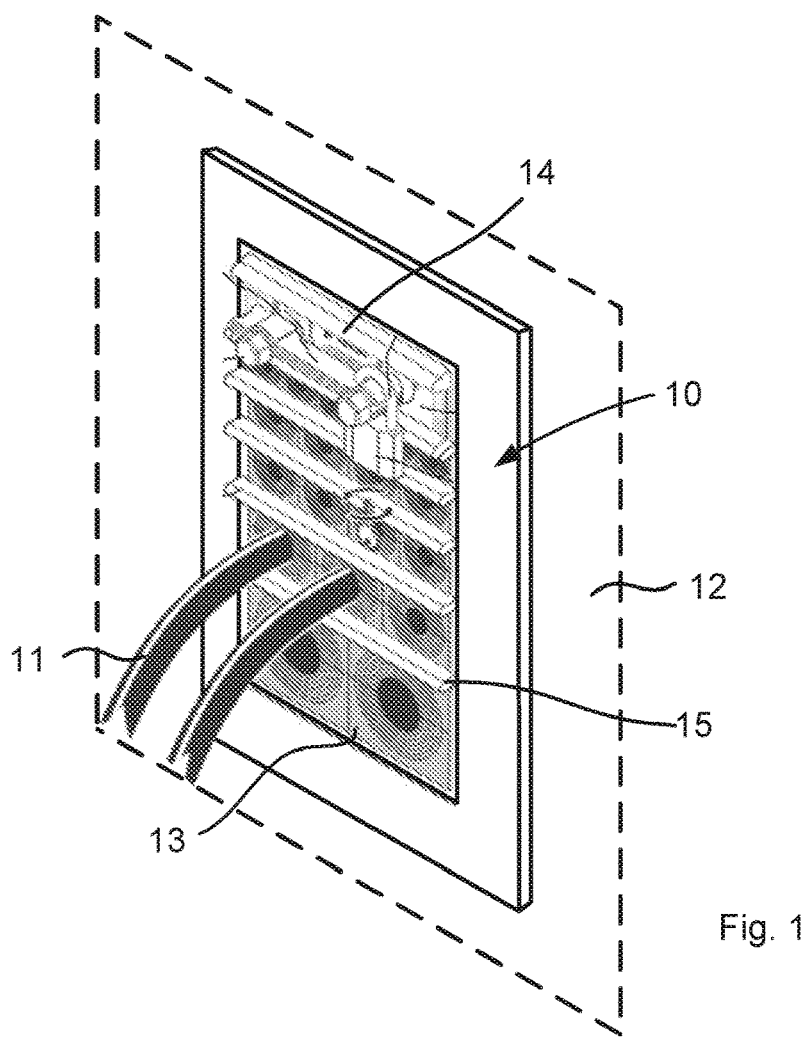
Fig. 1
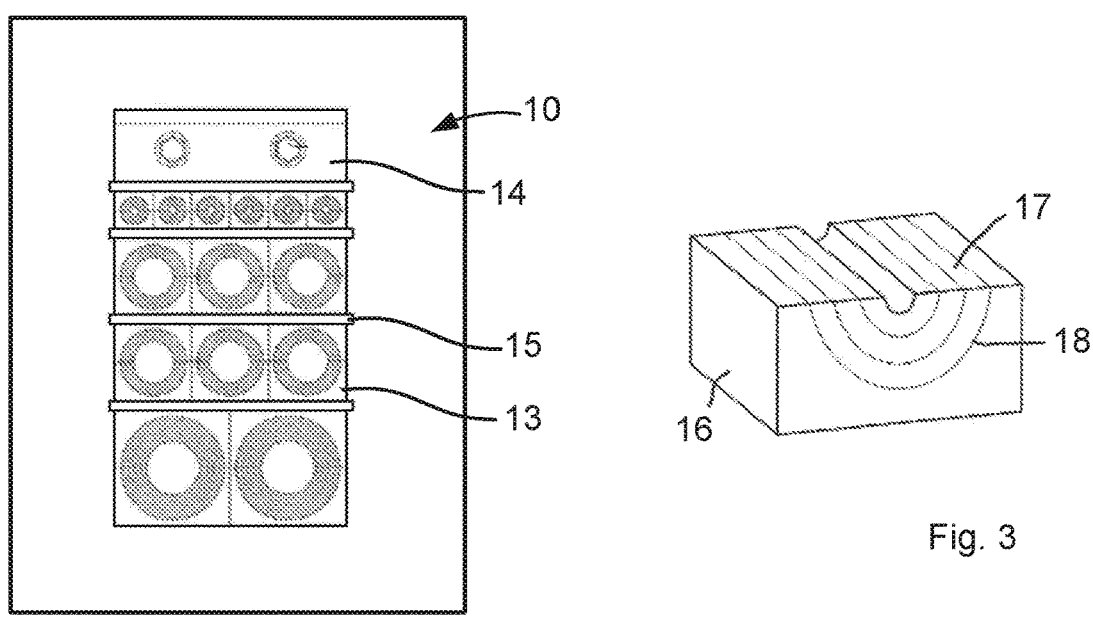
Fig. 2
Fig. 3

TRANSIT FOR PASSING CABLES AND/OR PIPES THROUGH A PARTITION OPENING AND USE OF SUCH A TRANSIT

This application is a National Stage Application of PCT/SE2021/051237, filed 13 Dec. 2021, which claims the benefit of Serial No. 2150001-2, filed 4 Jan. 2021, in Sweden, and which applications are hereby incorporated by reference in their entireties. To the extent appropriate, a claim of priority is made to each of the above disclosed applications.

TECHNICAL FIELD

The present invention is related to a transit for passing at least one cable or pipe through a partition opening. More specifically, the present invention is related to such a transit comprising a first frame, a second frame and fastening screws for fastening the first frame to the second frame, wherein the first and second frames can be clamped on opposite sides of the partition by means of the fastening screws. Transits of this type is generally used for passing cables and pipes through partitions, such as walls, floors, roofs and ceilings, including load bearing walls, outer walls and any other types of walls of building structures, such as industrial buildings, laboratories, research facilities, houses, apartment buildings, commercial buildings and other buildings. The transits are generally for passing cables for electricity, communication, computers etc. or pipes for different gases or liquids such as water, compressed air, hydraulic fluid, cooking gas or other types of liquids or gases.

The present invention is also related to the use of such a transit.

BACKGROUND

A plurality of different transits for passing cables and pipes through a partition is known in the prior art. One prior art transit comprises a rectangular or circular frame receiving a number of sealing modules and a compression unit for compressing the modules. The frames are fastened to the partition around the partition opening by means of screwing or bolting the frame to the partition. Then, the sealing modules are arranged to enclose the cables and pipes and positioned inside the frame together with a compression unit, such as a wedge, wherein the sealing modules are compressed by means of the compression unit to press against the cables and pipes and against the inner walls of the frame to provide a sealed transit.

However, for some applications there is a need to improve screening or sealing properties of such transits.

SUMMARY OF THE INVENTION

In view of the above, one object of the present invention is to provide a transit for passing at least one cable or pipe through a partition opening, which transit provides improved screening or sealing properties. The transit according to the present invention is particularly useful in applications where at least one side of the partition is subject to high hygiene requirements or demands low levels of particulates. For example, the transit according to one embodiment of the present invention may be particularly useful for cleanrooms, laboratories, hospitals and similar facilities and also facilities for sensitive equipment.

The present invention is related to a transit for passing at least one cable and/or pipe through a partition opening, wherein the transit comprises a first frame, a second frame and fastening screws for fastening the first frame to the second frame, wherein the second frame is arranged with through apertures for the fastening screws and the first frame is arranged with holes for receiving a threaded end of the screws, so that the first and second frames can be clamped on opposite sides of the partition by means of the fastening screws, characterised in that the transit further comprises a partition opening liner for engaging the first frame and the second frame and thereby form a radially lined passage extending in an axial direction between the first frame and the second frame. The combination of the clamping of the first and second frames and the partition opening liner according to the present invention makes it possible to efficiently screen or seal the partition opening to provide a lined passage while avoiding screw holes in the partition and also avoiding screw holes from an exposed outer surface of the first frame. Hence, the passage through the partition can be lined to efficiently prevent dust and debris from the partition to enter the passage and, according to various embodiments, also to seal the passage from the partition to prevent leakage of liquids or gases between the passage and the partition. Also, the exposed outer surface of the first frame can be arranged without holes for screws. This is particularly useful for environments that demands for a high hygiene standard and/or low levels of particulates, such as laboratories, cleanrooms, surgery rooms and similar facilities as well as facilities for sensitive equipment.

The partition opening liner can comprise at least a first liner element and a second liner element cooperating with each other to form the partition opening liner, wherein the transit easily can be adapted to partitions of different thicknesses.

According to a first aspect, the partition opening liner can comprise a plurality of liner elements formed in a resilient sealing material, such as rubber or elastomer material, wherein the liner elements can be positioned adjacent to each other in the axial direction to form an axially extending and radially sealed passage between the first and second frames through the partition opening. The outermost liner elements can seal, directly or indirectly, against the first and second frames.

The liner elements can be formed with through holes for the fastening screws. Hence, the liner elements, such as a selected number of liner elements to adapt the partition opening liner to the thickness of the partition, can be easily mounted and, in the case of resilient liner elements, can be efficiently compressed to seal the transit.

The liner elements can be formed with different thicknesses in the axial direction to provide a set of liner elements, which easily can be adapted to the thickness of the partition and, in the case of resilient liner elements, provide suitable compression for sealing the transit.

According to a second aspect, the liner elements form a telescopic structure for easy adaptation of the partition opening liner to the thickness of the partition. The first liner element can be attached to an inner side of the first frame, e.g. through a fixed connection, such as welding, or a detachable connection, such as screws arranged from the inner side of the first frame or through a form-fit connection by inherently resilient flexible portions or similar. Hence, the first liner element can be attached to the first frame without penetrating the first frame by any fastening means to provide a smooth continuous surface on an outer side of the first frame, which can be favourable in terms of hygiene and improves the sealing properties of the transit. The second liner element can be fixed to the second frame, such as through welding, or can be connected to the second frame through the fastening screws for efficient mounting.

The first frame can comprise an axially extending protrusion for insertion into the partition opening, which protrusion can be arranged with the holes for receiving the fastening screws. The protrusion with the holes provides efficient sealing by moving a part of the first frame into the partition opening, and also provides improved fastening and tightening possibilities in an efficient manner. The holes for the screws can be arranged in a radially outward or inward extending flange of the protrusion. The flange is then arranged at a distance from a frame plate of the frame and the holes can be through holes for receiving the fastening screws without interfering with the outer surface of the frame. Alternatively, the holes in the first frame for receiving the fastening screws can be threaded blind holes. In any case, the first frame can be connected to the second frame through the fastening screws without penetrating the exposed outer side of the first frame and thereby providing a smooth continuous surface on the outer side of the first frame, which can be favourable in terms of hygiene and improves the sealing properties of the transit.

The present invention is also related to the use of the transit in the partition opening of a partition of concrete or a partition comprising studs provided with a panel, such as a partition having a thickness of at least 50 mm, at least 80 mm or at least 100 mm. For example, the partition comprises panel in the form of metal sheets. Alternatively, the partition comprises panel in the form of sheets comprising plastic materials. For example, the partition comprises two panels facing each other and with insulation, such as mineral wool, glass wool or similar, between them. For example, the partition is a sandwich structure.

Further characteristics and advantages of the present invention will become apparent from the description of the embodiments below, the appended drawings and the dependent claims.

BRIEF DESCRIPTION OF THE DRAWINGS

The invention will be described further below by way of embodiment examples and with reference to the enclosed drawings, in which:

FIG. 1 is a schematic perspective view of a transit according to one embodiment, which transit is arranged in a partition in the form of a wall and provided with sealing modules, stayplates and a compression unit, FIG. 2 is a schematic front view of a transit according to one embodiment, which transit is provided with sealing modules, stayplates and compression unit, FIG. 3 is a schematic perspective view of a sealing module half for a transit according to one embodiment.

DETAILED DESCRIPTION

Figure 4:
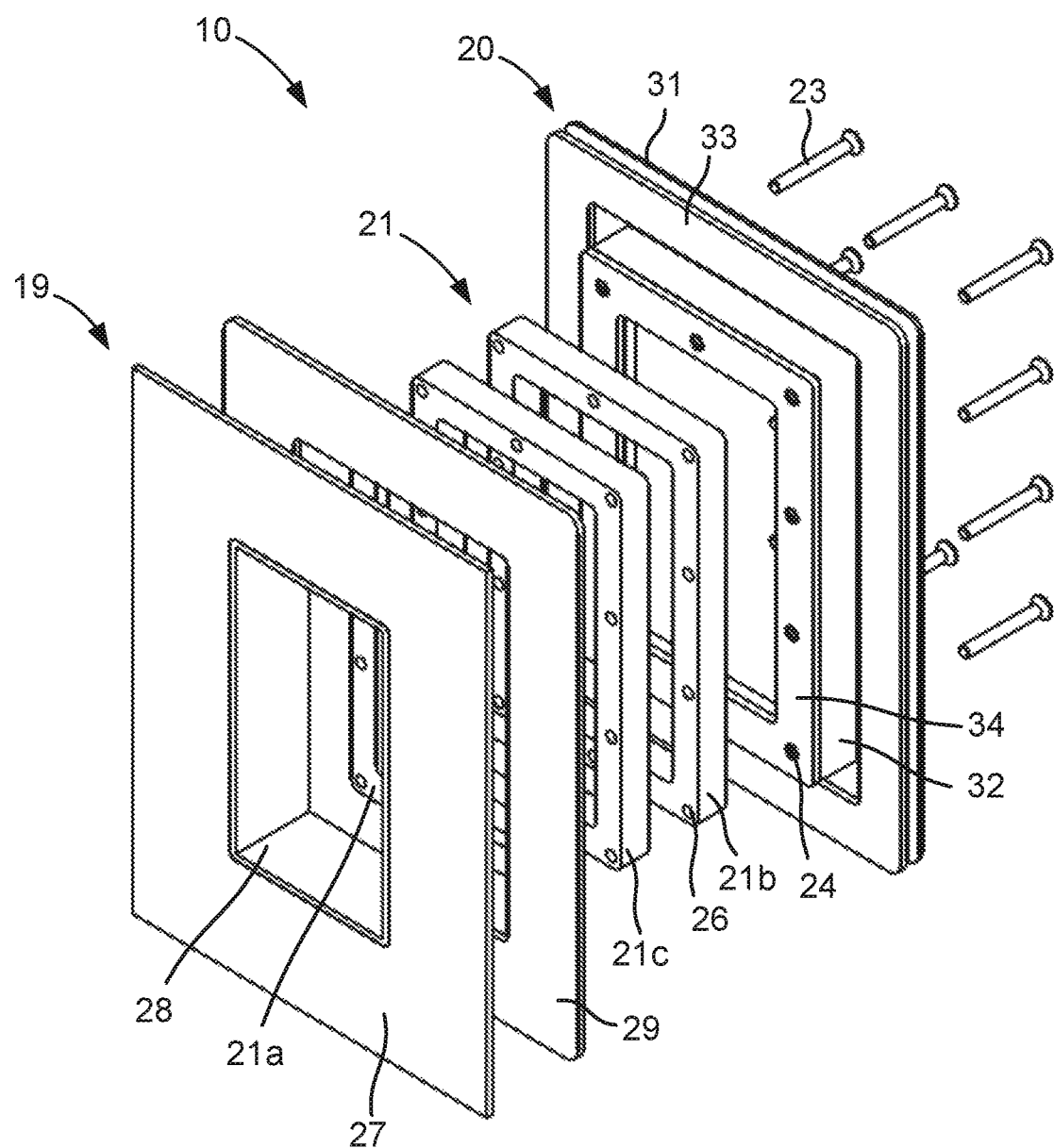
FIG. 4 is a schematic exploded perspective view of a transit according to a first aspect of the present invention.
Figure 5:
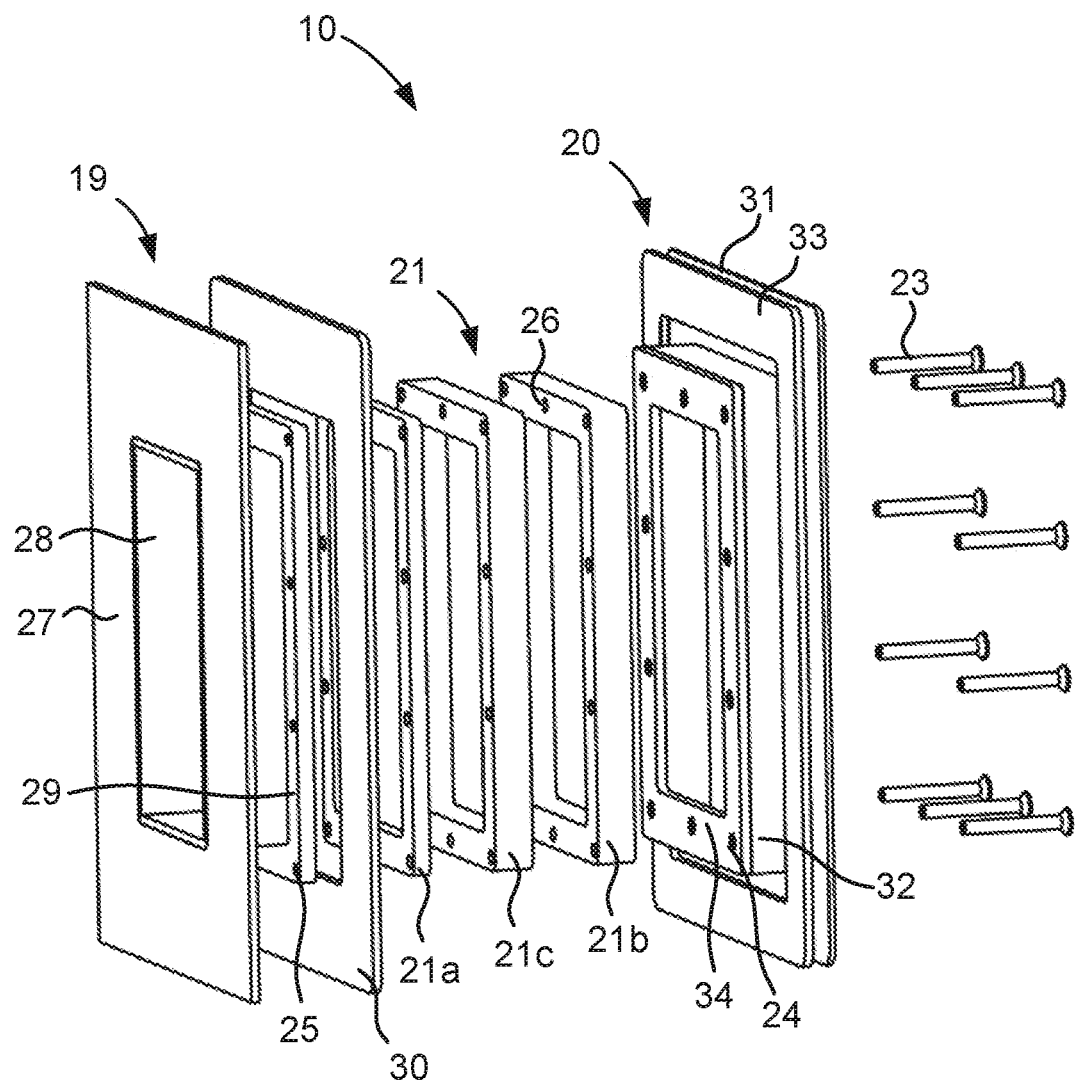
FIG. 5 is another schematic exploded perspective view of the transit according to the first aspect.
Figure 6:
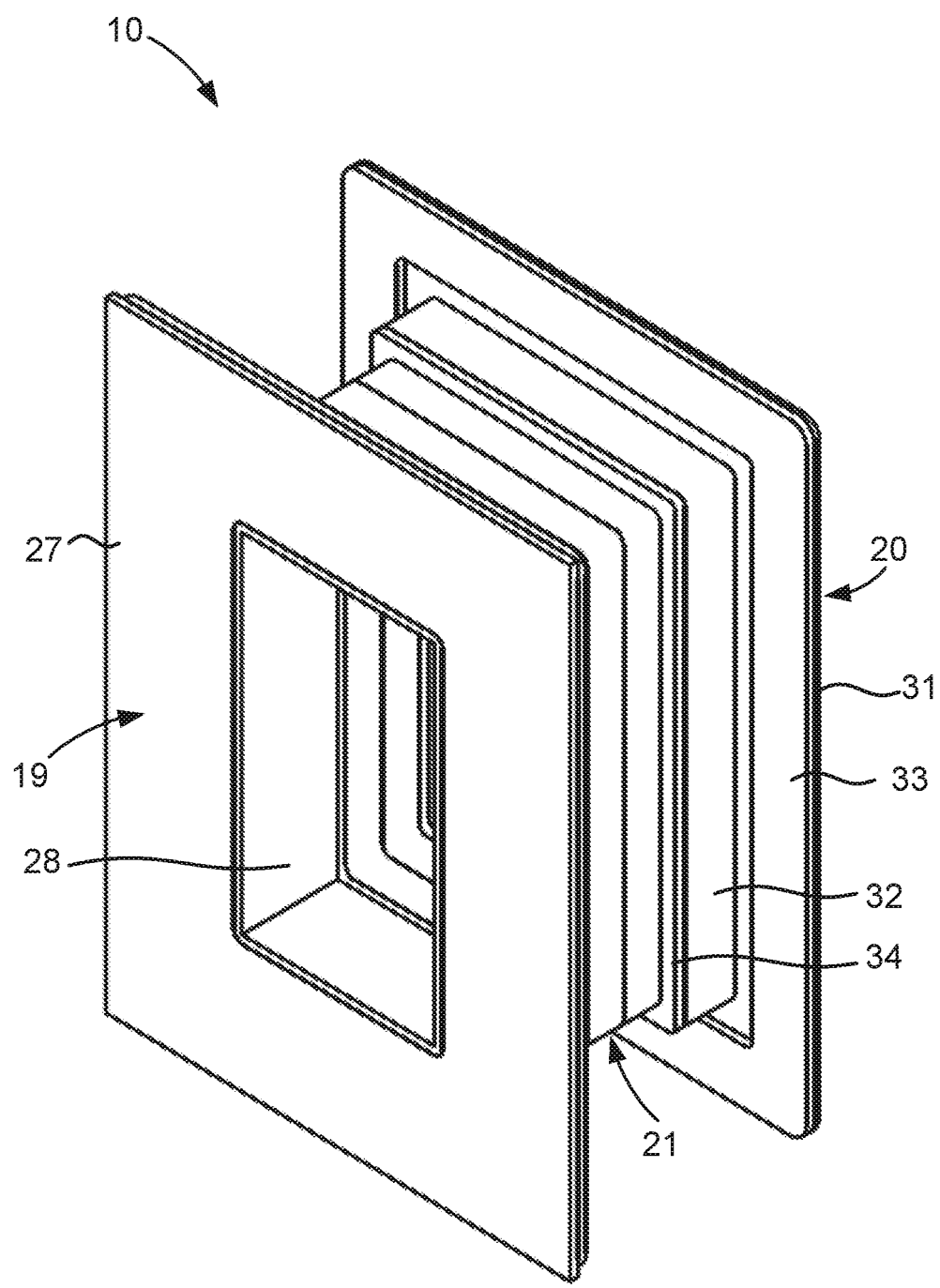
FIG. 6 is a schematic perspective view of the transit according to the first aspect.

With reference to FIG. 1 a transit 10 for passing at least one cable 11 and/or at least one pipe through a partition 12 is illustrated schematically according to one embodiment. The transit 10 is arranged for passing one or more cables 11 and/or pipes through a partition 12 in the form of a wall, a floor, a roof or a ceiling. For example, the transit 10 is arranged to be mounted in a partition 12 comprising concrete, such as a concrete wall or a concrete floor, or a partition 12 comprising studs provided with a panel. For example, the transit 10 is arranged for passing cables 11, such as cables for electricity, communication, computers etc., or pipes for different gases or liquids, such as water, compressed air, hydraulic fluid, cooking gas or other types of liquids or gases. For example, the transit 10 is arranged for passing one or more cables 11 and/or pipes between a first area and a second area, wherein at least the first area is an area with high demands in respect of hygiene and/or low levels of particulates. Such areas may, e.g. be laboratories, cleanrooms, surgery rooms and similar facilities as well as facilities for sensitive equipment. The partition 12 separates the first area from the second area.

The transit 10 according to FIG. 1 is arranged for receiving one or more sealing modules 13, a compression unit 14 and optionally stayplates 15. The sealing modules 13 may be arranged in different sizes and a plurality of different sealing modules 13 may be arranged in different configurations, which is illustrated also with reference to FIG. 2. For example, the sealing modules 13, the compression unit 14 and the stayplates 15, if applicable, are of conventional type. For example, the sealing modules 13 are resilient and comprises two opposite sealing halves 16, wherein each module half 16 comprises a plurality of peelable sheets 17 placed in a semi-cylindrical groove 18 as illustrated in FIG. 3. Optionally, a suitable number of peelable sheets 17 are removed to adapt the sealing module 16 to the diameter of the cable or pipe, wherein the cable 11 or pipe is placed in the module half 16 and a sealing module 13 is formed by placing two module halves 16 on top of each other. For example, the compression unit 14 is a conventional wedge.

With reference to FIGS. 4-8 the transit 10 is illustrated according to a first aspect of the present invention. The transit 10 comprises an axis A, a first frame 19, a second frame 20 and a partition opening liner 21 extending between the first and second frames. The partition opening liner 21 is to be arranged in a through opening 22 in the partition 12 to form a radially lined passage extending in the axial direction inside the opening 22 between the first frame 19 and the second frame 20, so that cables and/or pipes can be arranged through the partition 12 in the lined passage. The transit 10 mounted in the opening 22 in the partition 12 is illustrated schematically in FIG. 8. The axis A is perpendicular to a plane of the partition 12. For example, the axis A corresponds to a direction of the cable(s) 11 and or pipe(s) through the transit 10. The first frame 19 and the partition opening liner 21 are arranged to be attached to the second frame 20 by means of fastening screws 23. For example, at least the first frame 19 is arranged on a side of the partition 12 requiring low levels of particles. For example, the first frame 19 is arranged in a cleanroom, laboratory room, hospital room or a room with sensitive equipment. For example, also the second frame 20 is arranged in such a room. Alternatively, the second frame 20 is arranged in a regular room or outdoor.

The second frame 20 is arranged with through apertures 24 for the fastening screws 23 and the first frame 19 is arranged with threaded holes 25 for receiving a threaded end of the fastening screws 23, so that the first and second frames 19, 20 can be clamped on opposite sides of the partition 12 by means of the fastening screws 23, wherein the partition opening liner 21 is arranged between the first and second frames 19, 20. For example, the fastening screw 23 comprises a head and a shaft, which shaft is at least partially threaded to engage the threaded hole 25. For example, the fastening screw 23 is a conventional screw for mating with the threads inside the threaded hole 25. For example, the head of the fastenings screw 23 engages the second frame 20, optionally through a washer or similar conventional means, wherein the first frame 19 is drawn towards the second frame 20 when the screws 23 are tightened.

In the illustrated embodiment, the partition opening liner 21 comprises a plurality of liner elements, including a first liner element 21a, a second liner element 21b and optionally also a third liner element 21c and for example also further liner elements, which further liner elements are not illustrated. The liner elements 21a-c are positioned adjacent to each other in the axial direction and together form the partition opening liner 21 and the lined passage. For example, the liner elements 21a-c are arranged as closed loops having a central through opening forming the partition opening liner 21 and the lined passage when arranged next to each other. The liner elements 21a-c are formed with holes 26 for the fastening screws 23, wherein the fastening screws 23 can be arranged through the apertures 24 in the second frame 20, through the holes in the liner elements 21a-c and extend into the holes 25 of the first frame 19, so that the first and second frames 19, 20 and the liner elements 21a-c can be tightened together by means of the fastening screws 23 to form the transit 10. The apertures 24 in the second frame 20, the holes 25 in the first frame 19 and the holes in the liner elements 26 are illustrated schematically by dashed lines in FIG. 7. For example, the first and second frames 19, 20 are formed in sheet metal. Alternatively, the first and second frames 19, 20 are formed in plastic materials or other suitable polymer materials.

In the illustrated embodiment, the first frame 19 comprises a frame plate 27 connected to an axially extending and tubular protrusion 28. The tubular protrusion 28 is arranged with a radially extending flange 29. For example, the frame plate 27 and the flange 29 are arranged at opposite ends of the protrusion 28. The frame plate 27 is arranged with a through opening to the protrusion 28 to form the passage for the cables and/or pipes. For example, the through opening of the frame plate 27 is a central opening. Hence, the first frame 19 forms a closed loop around the passage. For example, the frame plate 27 and the protrusion 28 both form closed loops around the axially extending passage. For example, the protrusion 28 with the flange 29 is arranged to be inserted into the opening 22 in the partition 12. The holes 25 for the fastening screws 23 are arranged in the flange 29, such as axially into the flange 29 and optionally through the flange 29. Alternatively, the first frame 19 is arranged without the flange 29, wherein the holes 25 are arranged directly into the wall or walls of the axially extending protrusion 28, which wall or walls then are formed with a suitable wall thickness for being provided with the holes 25. The frame plate 27 is arranged to be pressed against an outer surface of the partition 12, e.g. with a sealing sheet 30 between the frame plate 27 and the partition 12 around the partition opening 22. Hence, the frame plate 27 has a plane extending in the radial direction. For example, the plane of the frame plate 27 extends in parallel to a plane of the flange 29, wherein the protrusion 28 extends between them. Hence, a free end of the flange 29 is arranged with a gap to the frame plate 27 in the axial direction.

In the embodiment according to the first aspect, the liner elements 21a-c are formed in a resilient material, such as rubber or elastomer material for sealing purposes. For example, the liner elements 21a-c are formed in a resilient material to provide a water-tight or gas-tight partition opening liner 21. In the illustrated embodiment, the first liner element 21a seals against the first frame 19, wherein the second liner element 12b seals against the second frame 20, and wherein the liner elements 21a-21c seal against an adjacent liner element in the axial direction to radially seal the axially extending passage between the first frame 19 and the second frame 20. The liner elements 21a-c are formed with a through opening, such as a central through opening to form the axially extending passage for the cable(s) and/or pipe(s). According to the illustrated embodiment, one or more of the liner elements 21a-c is/are formed with a different thickness in the axial direction. The holes 26 in the liner elements 21a-c are aligned with the holes 25 in the first frame 19 and the apertures 24 in the second frame 20.

Figure 7:
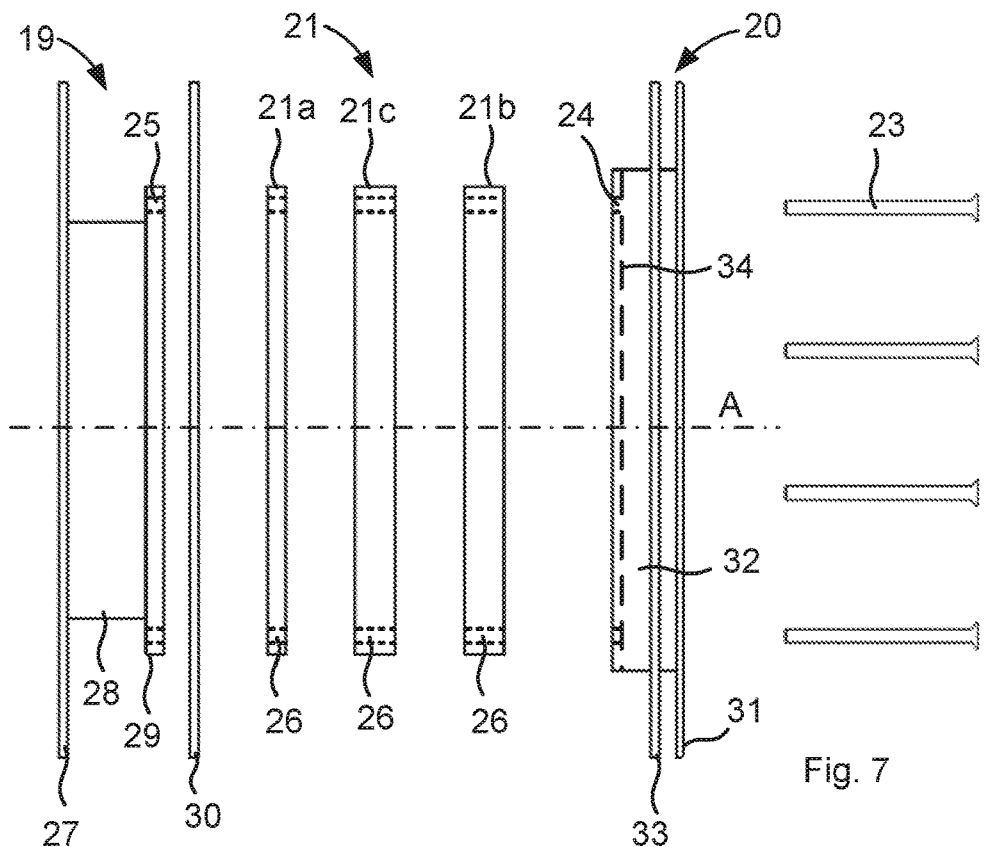
FIG. 7 is a schematic exploded side view of the transit according to the first aspect.
Figure 8:
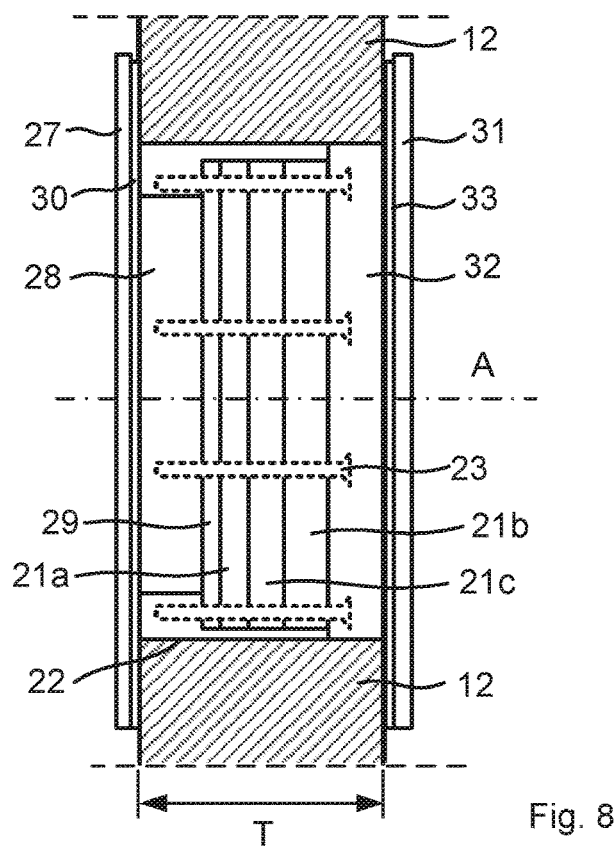
FIG. 8 is a schematic side view showing the transit of FIG. 7 arranged in a partition in the form of a wall.

According to the embodiment of FIGS. 4-8, the second frame 20 comprises a frame plate 31 and an axially extending tubular protrusion 32, wherein the frame plate 31 is arranged to be pressed against an outer side of the partition 12, optionally with a sealing sheet 33 between the frame plate 31 and the partition 12, in a corresponding manner as described above for the first frame 19. The protrusion 32 of the second frame 20 comprises a flange 34 with the through apertures 24 for the fastening screws 23. In the illustrated embodiment, the flange 34 extends radially inwards and is in FIG. 7 illustrated with dashed lines. For example, the flange 34 of the second frame 20 extends in parallel to the frame plate 31. The protrusion 32 with the flange 34 of the second frame 20 is, e.g. arranged to be inserted into the opening 22 in the partition 12, as illustrated in FIG. 8.

The partition 12 may be a wall, floor, roof or similar. According to one embodiment, the partition 12 is of concrete or comprises concrete or equivalent materials. Alternatively, the partition 12 comprises studs provided with panel (not illustrated). For example, the partition 12 has a thickness T of at least 50 mm, at least 80 mm or at least 100 mm. In the embodiment illustrated in FIG. 8, the fastening screws 23 are shorter than the thickness T of the partition 12 and are arranged inside the opening 22 of the partition 12.

To mount the transit 10 according to the embodiment of FIGS. 4-8 the protrusion 28 of the first frame 19 is inserted into the opening 22 of the partition 12, optionally with the sealing sheet 30 between the frame plate 27 and the outer surface of the partition 12 around the opening 22. Fastening screws 23 are arranged through the apertures 24 in the second frame 20. A suitable number of liner elements 21a-c, and optionally suitable liner element thickness, considering the thickness T of the partition 12 is selected, wherein the fastening screws 23 are brought though the holes 26 in the liner elements 21a-c and into the holes 25 in the first frame 19. Then, the fastening screws 23 are tightened at the side of the second frame 20, wherein the frame plate 27 of the first frame 19 is forced towards the partition 12 and the liner elements 21a-c are compressed to form a sealed passage through the partition 12 where the first and second frames 19, 20 are clamped onto the partition 12 on opposite sides thereof with the fastening screws 23 extending inside the opening 22 of the partition 12. Sealing modules 13, compression unit 14 and stayplates 15 can be arranged inside the first frame 19 and/or the second frame 20, such as inside the axial tubular protrusion 28 of the first frame 19 and inside the axial tubular protrusion 32 of the second frame 20.

Figure 9:
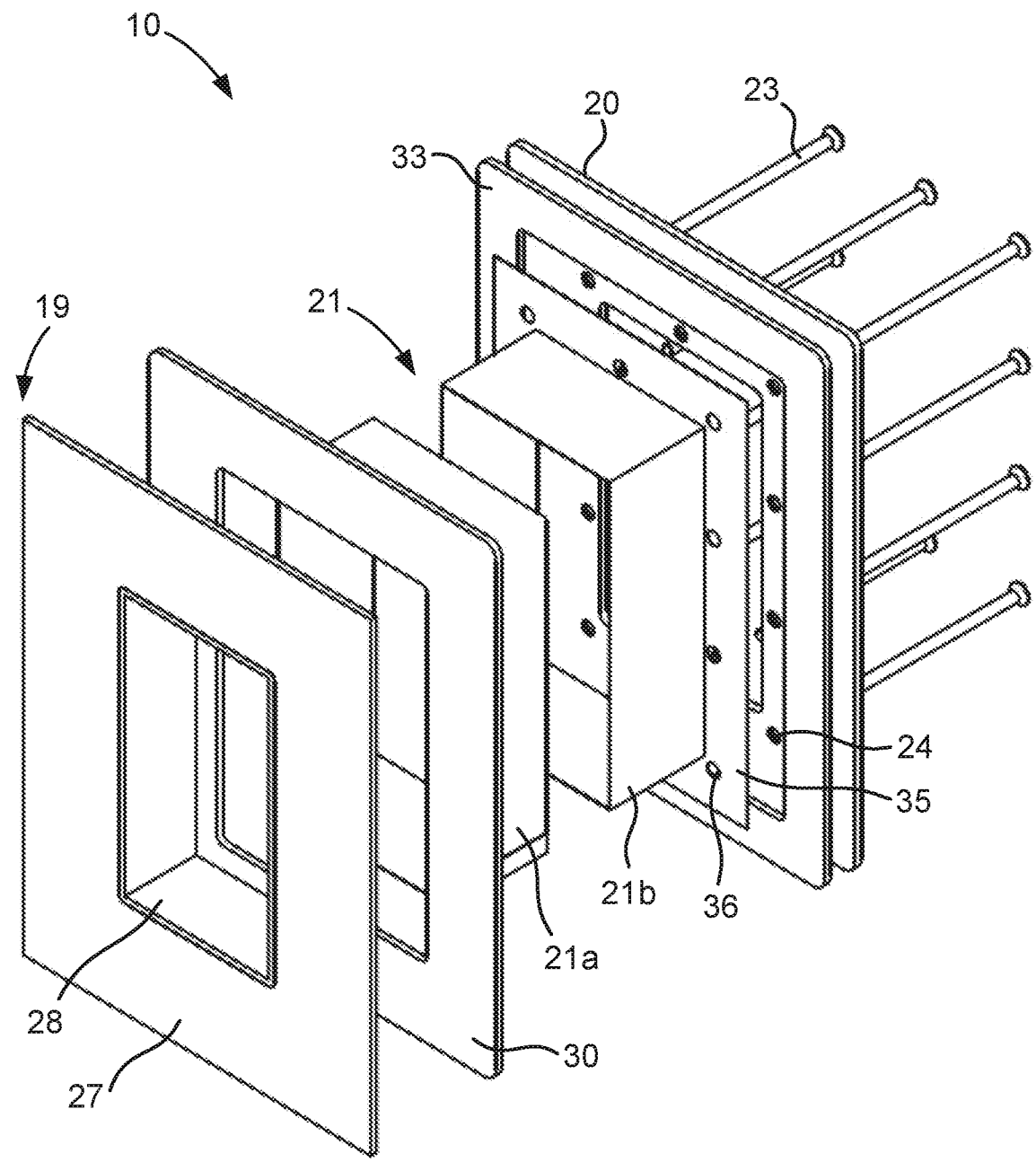
FIG. 9 is a schematic exploded perspective view of a transit according to a second aspect of the present invention.
Figure 10:
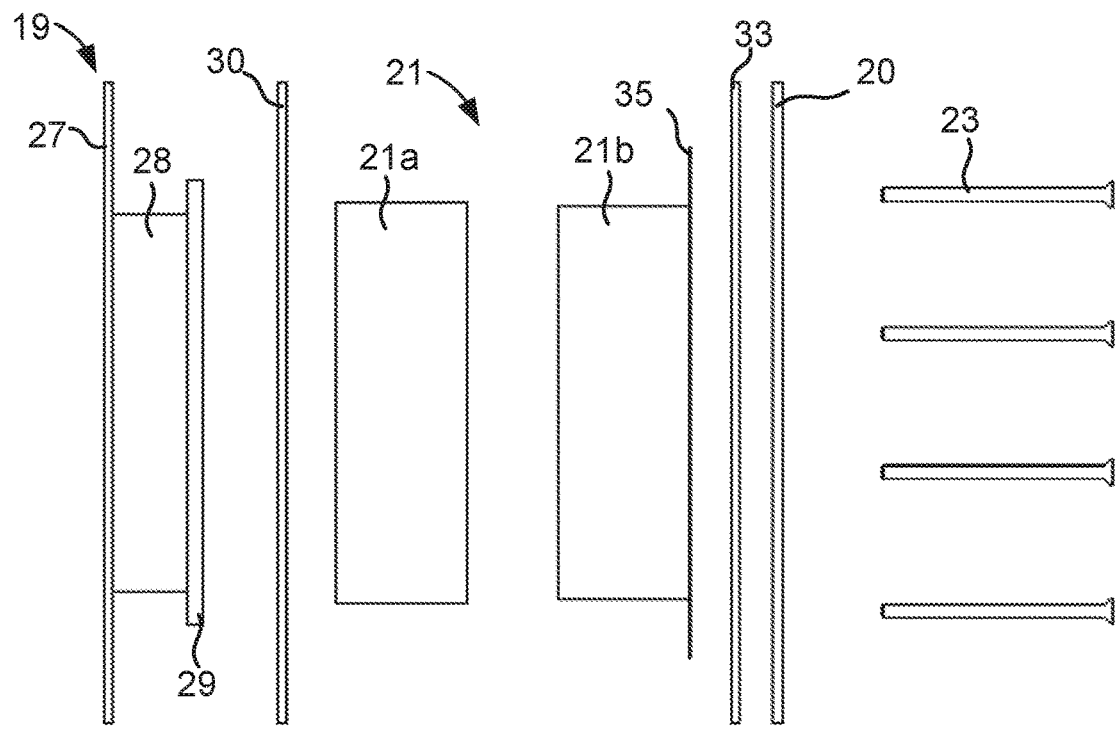
FIG. 10 is a schematic exploded side view of the transit according to the second aspect.
Figure 11:
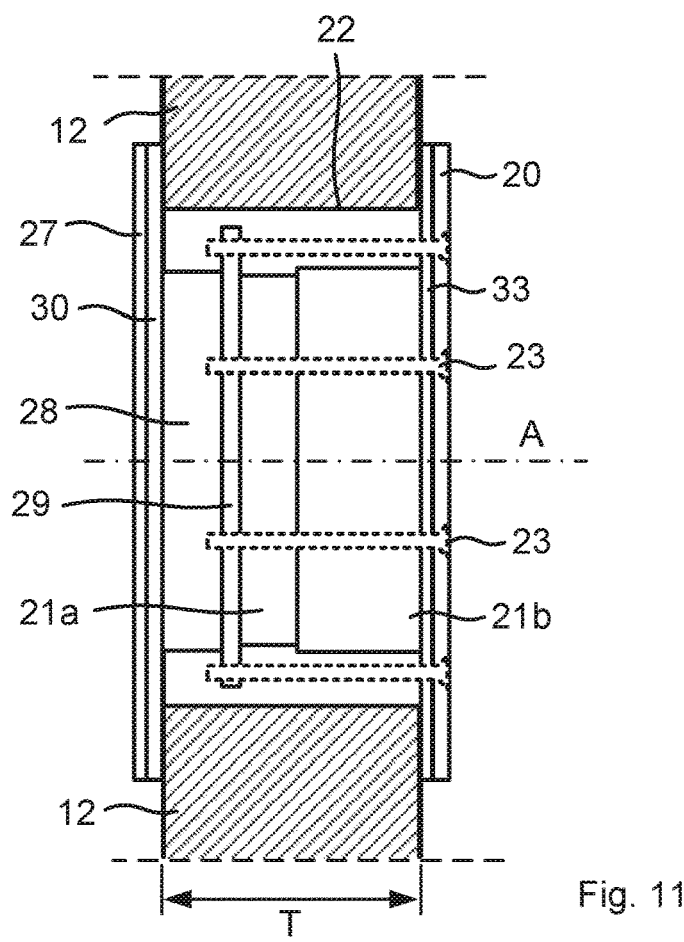
FIG. 11 is a schematic side view of the transit according to the second aspect arranged in a partition in the form of a wall.

With reference to FIGS. 9-11 a transit 10 according to a second aspect of the present invention is illustrated schematically. In the illustrated embodiment of the second aspect, the first frame 19 comprises the frame plate 27, protrusion 28 and the flange 29 with the holes 25 as described above with reference to the first aspect of the invention. Also, sealing sheets 30, 33 may be arranged as described above. However, the second aspect differs from the first aspect in the structure of the partition opening liner 21 and, in the illustrated embodiment, also the second frame 20.

In the second aspect as illustrated, the second frame 20 is arranged as a frame plate with a central opening forming the passage for the cable(s) or pipe(s). The second frame 20 is arranged to be pressed against the outside of the partition 12, optionally through the sealing sheet 33. The second frame 20 is provided with the through apertures 24 extending perpendicular to a plane of the second frame 20 and in the axial direction for receiving the fastening screws 23. The fastening screws 23 are illustrated by means of dashed lines in FIG. 11.

The partition opening liner 21 comprises at least the first liner element 21a and the second liner element 21b, which cooperate to form the partition opening liner 21 extending through the partition opening 22. The first and second liner elements 21a, 21b are tubular to form a radially closed liner inside the partition opening 22. In the illustrated embodiment, the second liner element 21b is received telescopically in the first liner element 21a, wherein the length of the partition liner element 21 is adjustable in the axial direction to fit partitions 12 of different thicknesses T. Optionally, the partition opening liner 21 comprises further liner elements cooperating with the others correspondingly. Hence, one of the liner elements 21a, 21b is arranged with a smaller diameter or cross section area, so that an end thereof can be inserted axially into the end of the other. In the illustrated embodiment, the second liner element 21b comprises a flange 35 with through holes 36 for receiving the fastening screws 23. In the embodiment of FIGS. 9-11 the flange 35 extends outwards. Hence, the second liner element 21b is attached to the second frame 20 through the fastening screws 23. The first liner element 21a is supported by the second liner element 21b. Alternatively, the first liner element 21a is connected to the first frame 19, fixedly or detachably, such as through resilient flexible fastening means forming a snap-lock or similar. According to one embodiment, the first and second liner elements 21a, 21b are arranged in sheet metal. Alternatively, the liner elements 21a, 21b are arranged in plastic, rubber or elastomer materials. In the illustrated embodiments, the frames 19, 20 and the partition opening liner 21 are formed with a rectangular cross section. Alternatively, the cross section of the transit 10 is substantially circular to fit in a substantially circular partition opening 22. Regardless of the outer shape of the transit 10, the axial passage formed by the transit 10 may be rectangular or circular to be provided with one or more suitable conventional sealing modules and compression unit.

In the second aspect of the invention, the threaded end of the fastening screws 23 are arranged inside the partition opening 22, outside the lined passage through the partition opening 22 formed by the transit 10. The fastening screws 23 stop short of the frame plate 27 of the first frame 19, and optionally also stop short of the sealing sheet 30 between the outer surface of the partition 12 and the frame plate 27 of the first frame 19. The fastening screws 23 are inserted from the outer side of the second frame 20 and the screw heads are arranged accessible from the outer side of the second frame 20. Sealing modules 13, compression unit 14 and stayplates 15 can be arranged inside the first frame 19, such as in the central opening of the frame plate 27 and the axial tubular protrusion 28.

The invention claimed is:

1. A transit for passing at least one cable and/or at least one pipe through an opening in a partition, wherein the transit comprises a first frame, a second frame and fastening screws for fastening the first frame to the second frame, and at least one sealing module for receiving the at least one cable and/or the at least one pipe,
   wherein the second frame is arranged with through apertures for the fastening screws and the first frame is arranged with threaded holes for receiving a threaded end of the screws, so that the first and second frames can be clamped on opposite sides of the partition by means of the fastening screws,
   wherein the transit further comprises a partition opening liner for engaging the first frame and the second frame and thereby form a radially lined passage extending in an axial direction between the first frame and the second frame,
   wherein the first frame comprises an axially extending protrusion for insertion into the partition opening,
   wherein the protrusion is arranged with the threaded holes for receiving the fastening screws,
   wherein the sealing module is arranged inside the first frame and is formed of two module halves,
   wherein each module half has a semi-cylindrical groove, and a compression unit arranged inside the first frame for compressing the sealing module,
   wherein the partition opening liner comprises at least a first liner element and a second liner element cooperating with each other to form the partition opening liner, and
   wherein one of the liner elements is received telescopically in the other liner element.

2. The transit of claim 1, wherein the liner elements are formed in a resilient material, wherein the first liner element seals against the first frame, wherein the second liner element seals against the second frame, and wherein the liner elements seal against an adjacent liner element in the axial direction to radially seal the axially extending passage between the first frame and the second frame.

3. The transit of claim 2, wherein the liner elements are formed with through holes for the fastening screws.

4. The transit of claim 2 wherein the liner elements are formed of rubber or elastomer material.

5. The transit of claim 2, wherein at least one of the liner elements is formed with a different thickness in the axial direction.

6. The transit of claim 1, wherein the first liner element is connected to the first frame, and wherein the second liner element is attached to the second frame.

7. The transit of claim 6, wherein the second liner element is attached to the second frame through the fastening screws.

8. The transit of claim 1, wherein the axially extending protrusion comprises a flange with the threaded holes for receiving the fastening screws.

9. The transit of claim 1, wherein at least the first frame forms a closed loop around a through opening.

10. The transit of claim 1, wherein at least the first frame is provided with a sealing sheet—for engaging the partition around the partition opening.

11. The transit of claim 1, comprising a number of peelable sheets placed in the semi-cylindrical groove of each module half.

\* \* \* \* \*